(12) United States Patent
Gatchalian et al.

(10) Patent No.: US 12,445,348 B2
(45) Date of Patent: Oct. 14, 2025

(54) ELECTRONIC SYSTEM FOR PROACTIVE RESILIENCY, REDUNDANCY AND SECURITY REMEDIATION ACROSS A NETWORK BASED ON DYNAMIC ANALYSIS OF TECHNOLOGY APPLICATIONS

(71) Applicant: BANK OF AMERICA CORPORATION, Charlotte, NC (US)

(72) Inventors: Gilbert Gatchalian, Union, NJ (US); Kamal Sharma, Mason, OH (US); Noell York Eury, Charlotte, NC (US); Dhananjay Bhat, North Chelmsford, MA (US); Kevin A. Delson, Woodland Hills, CA (US); Russ Ferguson, Brooklyn, NY (US); Satya Veerabhadra Rao Iruku, Chesterfield, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/224,640

(22) Filed: Jul. 21, 2023

(65) Prior Publication Data

US 2025/0030592 A1    Jan. 23, 2025

(51) Int. Cl.
*H04L 41/0654* (2022.01)
*G06F 11/07* (2006.01)
(Continued)

(52) U.S. Cl.
CPC ...... *H04L 41/0654* (2013.01); *G06F 11/0793* (2013.01); *G06F 11/1464* (2013.01);
(Continued)

(58) Field of Classification Search
None
See application file for complete search history.

(56) References Cited

U.S. PATENT DOCUMENTS 8,433,194 B2    4/2013 Nesset et al.
8,488,476 B2    7/2013 Delregno et al.
(Continued)

FOREIGN PATENT DOCUMENTS

WO    WO-2013077249 A1 *  5/2013  ........... H04B 10/032
WO    WO-2023015644 A1 *  2/2023

*Primary Examiner* — Lance Leonard Barry
(74) *Attorney, Agent, or Firm* — Moore & Van Allen PLLC; Vaidehi Bachoti

(57) ABSTRACT

Embodiments of the invention are directed to systems, methods, and computer program products for proactive resiliency, redundancy and security remediation across a network based on dynamic analysis of technology applications. The invention involves determining whether an entity communication network comprises a redundant technology application associated with a technology application such that the redundant technology application renders a processing activity of the first technology application resilient. Here, the invention involves constructing network vulnerability components associated with a first data flow comprising an open vulnerability component, an unauthorized technology component, and an open security component. The invention may determine a prognostic failure associated with the first data flow based on determining that the entity communication network does not comprise at least one first redundant technology application associated with the first technology application.

17 Claims, 4 Drawing Sheets

(51) Int. Cl.
  *G06F 11/14* (2006.01)
  *G06F 11/16* (2006.01)
  *H04L 41/0866* (2022.01)
  *H04L 41/149* (2022.01)
(52) U.S. Cl.
  CPC .......... *G06F 11/16* (2013.01); *H04L 41/0866* (2013.01); *H04L 41/149* (2022.05)

(56) References Cited

U.S. PATENT DOCUMENTS

| | | | |
|---|---|---|---|
| 8,966,052 B2 | 2/2015 | Delregno et al. | |
| 10,218,782 B2 | 2/2019 | Hopen et al. | |
| 10,230,788 B2 | 3/2019 | Morrill et al. | |
| 10,243,826 B2 | 3/2019 | Dasu et al. | |
| 10,616,043 B2 | 4/2020 | Wang et al. | |
| 10,649,866 B2 | 5/2020 | Biermayr et al. | |
| 10,691,810 B1 * | 6/2020 | Freitag | G06F 8/71 |
| 10,931,567 B2 | 2/2021 | Li et al. | |
| 11,057,266 B2 | 7/2021 | Jain et al. | |
| 11,222,008 B2 | 1/2022 | Palmer | |
| 11,275,639 B2 | 3/2022 | Wang et al. | |
| 11,363,475 B2 | 6/2022 | Wolcott et al. | |
| 11,388,055 B2 | 7/2022 | Sigoure | |
| 2006/0153070 A1 | 7/2006 | Delregno et al. | |
| 2007/0263547 A1 | 11/2007 | Hof et al. | |
| 2009/0055679 A1 * | 2/2009 | Langford | G06F 11/2025 714/4.1 |
| 2014/0201344 A1 * | 7/2014 | Copsey | H04L 67/1001 709/223 |
| 2015/0242636 A1 * | 8/2015 | Khan | H04L 63/1433 726/25 |
| 2016/0300065 A1 * | 10/2016 | Bang | G06F 21/52 |
| 2018/0013856 A1 | 1/2018 | Neerincx et al. | |
| 2019/0191426 A1 | 6/2019 | Hindawi et al. | |
| 2019/0215756 A1 | 7/2019 | Park et al. | |
| 2019/0312868 A1 | 10/2019 | Kiss et al. | |
| 2019/0379589 A1 | 12/2019 | Ryan et al. | |
| 2019/0394081 A1 | 12/2019 | Tahhan et al. | |
| 2020/0014558 A1 | 1/2020 | Koponen et al. | |
| 2020/0202007 A1 * | 6/2020 | Nagaraja | G06F 11/3684 |
| 2021/0119890 A1 | 4/2021 | Richards et al. | |
| 2021/0342204 A1 * | 11/2021 | Choudhury | G06F 11/0778 |

\* cited by examiner

ELECTRONIC SYSTEM FOR PROACTIVE RESILIENCY, REDUNDANCY AND SECURITY REMEDIATION ACROSS A NETWORK BASED ON DYNAMIC ANALYSIS OF TECHNOLOGY APPLICATIONS

BACKGROUND

Processing of electronic data files typically involves multiple processing stages. Systems for high volume data processing require multiple edge nodes and applications across various platforms running in order to implement the processing stages of electronic data. Moreover, processing of applications at downstream systems requires source data from upstream systems. However, due to evolution of production environments and applications, and inherent delays in data transmissions, shifts may occur that result in decrease of application resiliency or security, thereby undesirably causing failed processes and delayed processing. Due to utilizations of prior source data that is not current and incompatible with the application in real time, downstream systems may have undesirable failed processes and delayed processing. Moreover, conventional systems are not capable of dynamic data processing based on dynamic features like redundancy while identifying the real time data flows on various source systems for cascading the changes to downstream systems. Therefore, a need exists for novel network architectures that provide proactive resiliency, redundancy and security remediation across a network based on dynamic analysis of technology applications.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address these and/or other needs by providing an innovative system, method and computer program product for proactive resiliency, redundancy and security remediation across a network based on dynamic analysis of technology applications. The system is configured for dynamic and continuous processing of network activity data of a distributed network for proactively identifying network redundancy prior to network activity failure. Typically the system comprises: an entity communication network comprising a plurality of network nodes; a control system in operative communication with the entity communication network; at least one memory device with computer-readable program code stored thereon; at least one communication device; at least one processing device operatively coupled to the plurality of network nodes, the at least one memory device and the at least one communication device. Executing the computer-readable code is configured to cause the at least one processing device to: capture first data flow associated with a first technology application of a plurality of applications of the entity communication network, based on the network architecture; determine first network ownership components associated with the captured first data flow associated with the first technology application of the plurality of applications of the entity communication network; based on the determined network ownership components associated with the captured first data flow, determine whether (i) the entity communication network comprises at least one first redundant technology application associated with the first technology application such that the at least one first redundant technology application renders at least one processing activity of the first technology application resilient, and (ii) the first data flow is associated with at least one network vulnerability attribute; determine a prognostic failure associated with the first data flow based on determining that (i) the entity communication network does not comprise at least one first redundant technology application associated with the first technology application, and/or (ii) the first data flow is associated with at least one network vulnerability attribute; and trigger execution of at least one first remediation action, prior to occurrence of the prognostic failure associated with the first data flow, wherein the at least one first remediation action is structured to mitigate the prognostic failure associated with the first data flow.

In some embodiments, or in combination with any of the previous embodiments, capturing the first data flow associated with the first technology application further comprises: analyzing network traffic associated with each of the plurality network nodes; analyzing application logs associated with each of the plurality of applications of the entity communication network; and extracting application source code associated with the first technology application from a source code repository.

In some embodiments, or in combination with any of the previous embodiments, executing the computer-readable code is configured to further cause the at least one processing device to: determine the first network ownership components comprising a source component identifier, a destination component identifier, and hostname component associated with the first data flow at a network device inventory system of record; and determine the first technology application associated with the first data flow based on identifying a first network application identifier associated with the network ownership components at a network application inventory system of record.

In some embodiments, or in combination with any of the previous embodiments, executing the computer-readable code is configured to further cause the at least one processing device to: query a network resiliency catalog database to determine whether a record associated with the first network ownership components and the first network application identifier; and construct a first resiliency record associated with the first data flow from metadata associated with the first network ownership components and the first network application identifier, in response to a failure to determine a match between a plurality of records of the network resiliency catalog database and the first network ownership components and the first network application identifier.

In some embodiments, or in combination with any of the previous embodiments, executing the computer-readable code is configured to further cause the at least one processing device to: query a network resiliency catalog database to determine whether a record associated with the first network ownership components and the first network application identifier; and in response to determining a match of at least a portion of a first resiliency record of the plurality of records of the network resiliency catalog database with the first network ownership components and the first network application identifier, extract a security mechanism data structure associated with the first data flow from the first resiliency record.

In some embodiments, or in combination with any of the previous embodiments, executing the computer-readable code is configured to further cause the at least one processing device to: construct first network resiliency components associated with the first data flow, wherein the first network resiliency components comprise a first recovery point objective component, a first recovery time objective component, and a criticality level component.

In some embodiments, or in combination with any of the previous embodiments, determining whether the entity communication network comprises at least one first redundant technology application further comprises determining whether the at least one first redundant application matches the first network resiliency components associated with the first data flow.

In some embodiments, or in combination with any of the previous embodiments, determining the prognostic failure associated with the first data flow further comprises: determining that a second recovery point objective component associated with the at least one first redundant application exceeds the first recovery point objective component associated with the first data flow; and determining that a second recovery time objective component associated with the at least one first redundant application exceeds the first recovery time objective component associated with the first data flow.

In some embodiments, or in combination with any of the previous embodiments, executing the computer-readable code is configured to further cause the at least one processing device to: construct first network vulnerability components associated with the first data flow, wherein the first network resiliency components comprise a first open vulnerability component, a unauthorized technology component, and an open security component; and wherein determining the prognostic failure associated with the first data flow further comprises determining a match between the first data flow and at least a portion of the first network vulnerability components; and wherein triggering the execution of the at least one remediation action, prior to occurrence of the prognostic failure associated with the first data flow, further comprises blocking the processing of the first data flow.

In some embodiments, or in combination with any of the previous embodiments, executing the computer-readable code is configured to further cause the at least one processing device to: capture second data flow associated with a second technology application of the plurality of applications of the entity communication network; determine second network ownership components associated with the captured second data flow; based on the determined network ownership components associated with the captured first data flow, determine that the entity communication network comprises at least one second redundant technology application associated with the second technology application such that the at least one second redundant technology application renders at least one processing activity of the second technology application resilient; and trigger execution of at least one second remediation action, prior to occurrence of a second prognostic failure associated with the second data flow, wherein the at least one remediation action is structured to transfer processing of the second data flow to the at least one second redundant technology application.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
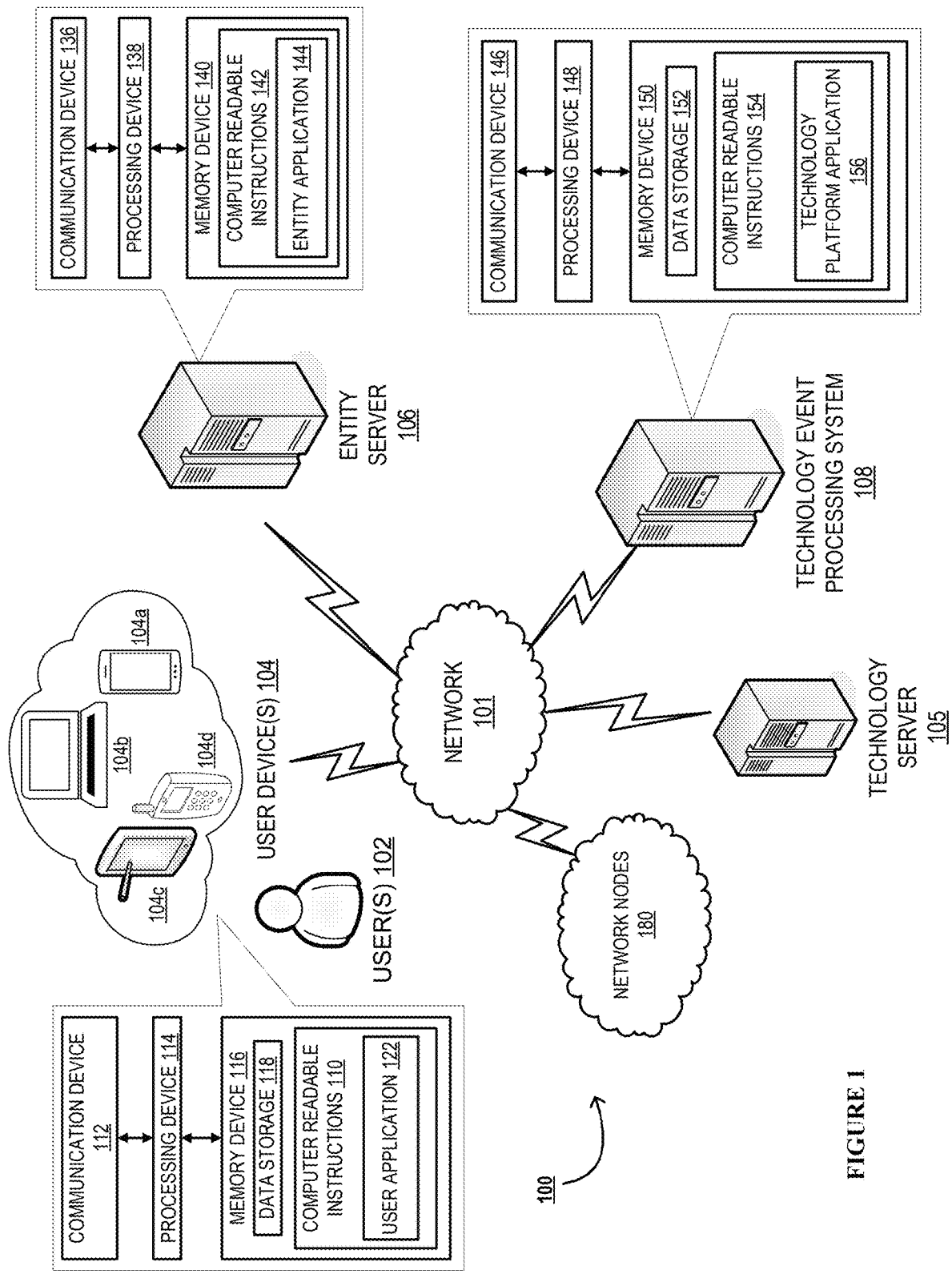
Figure 2:
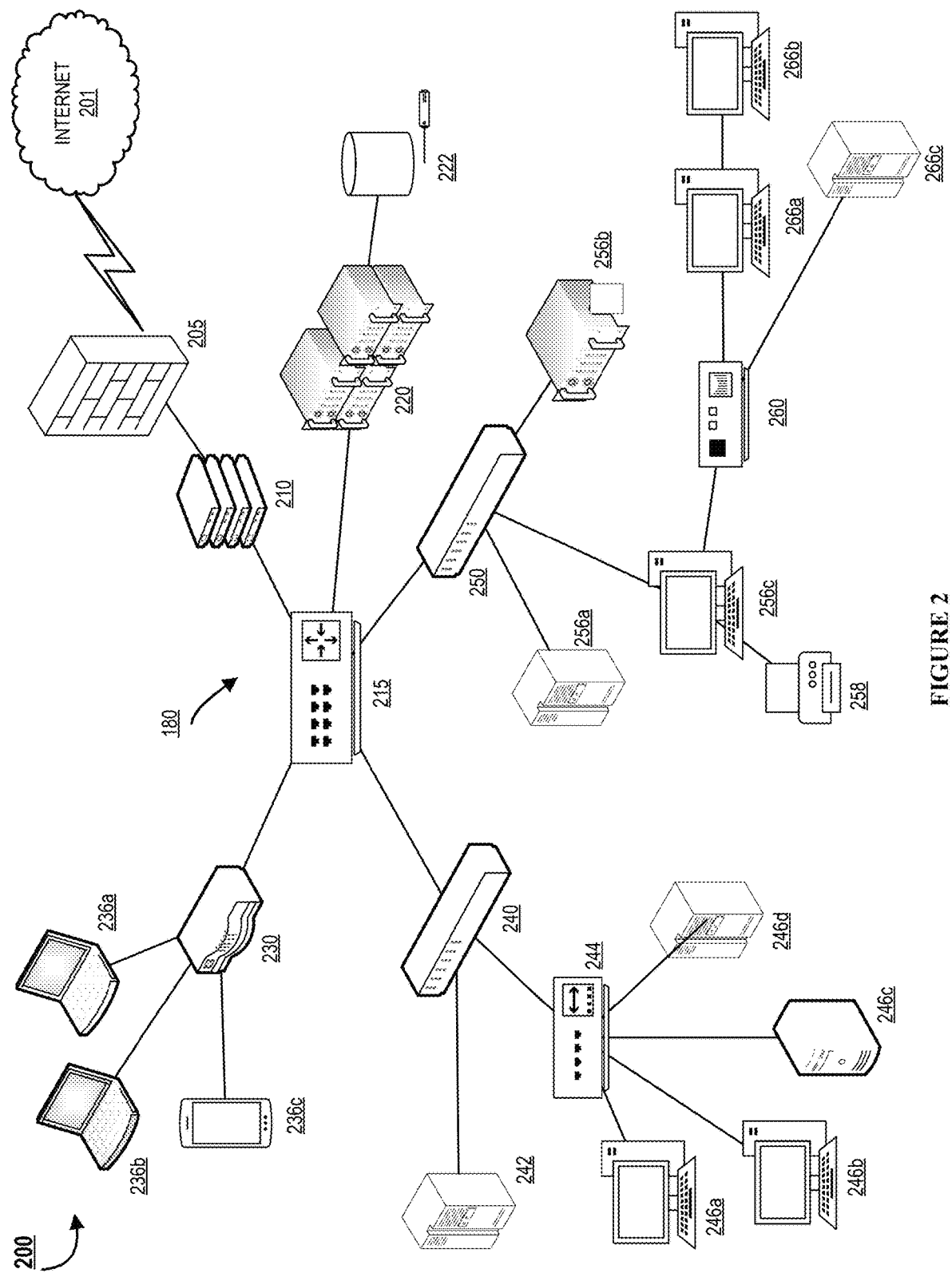
Figure 3:
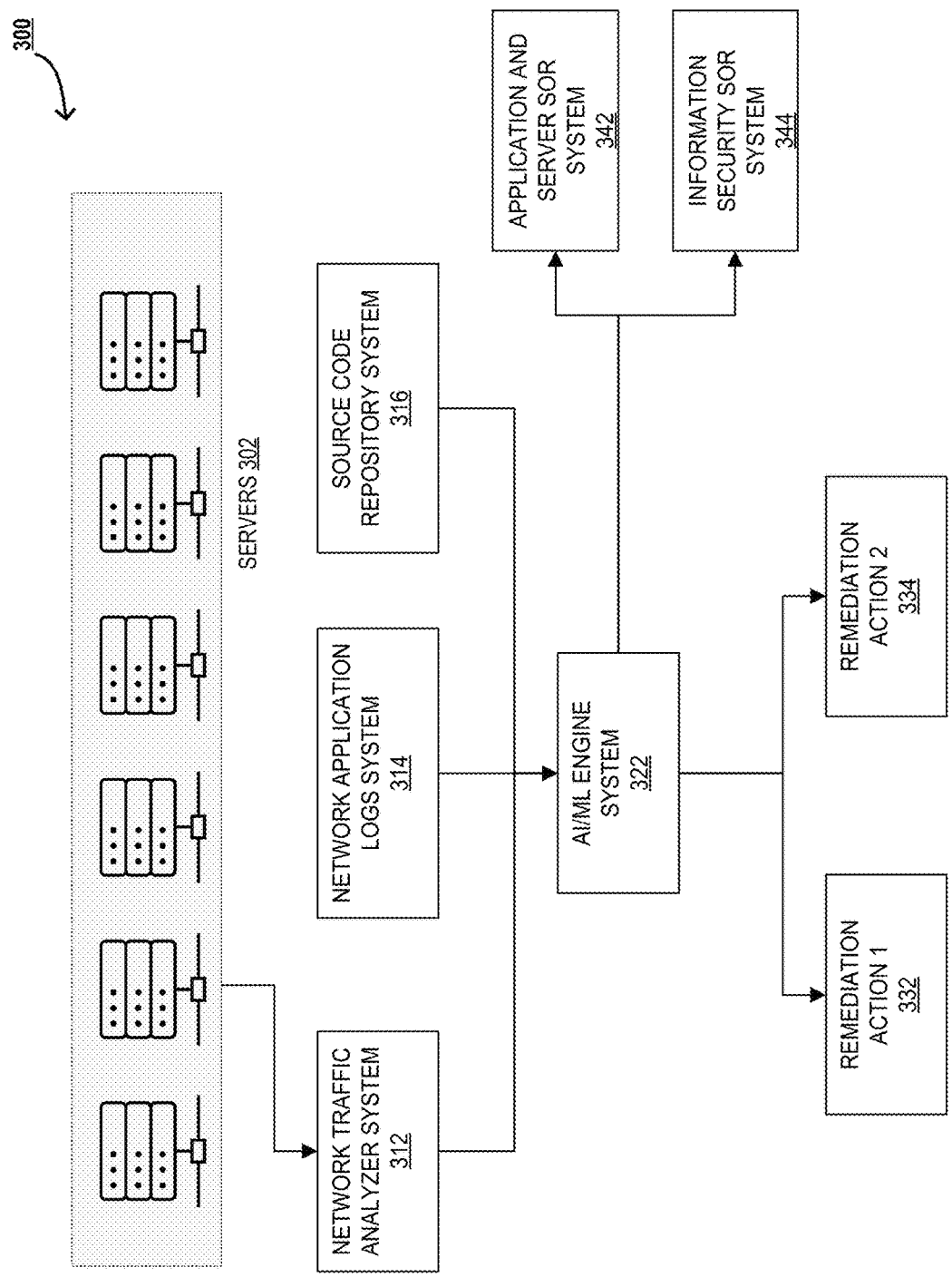
Figure 4:
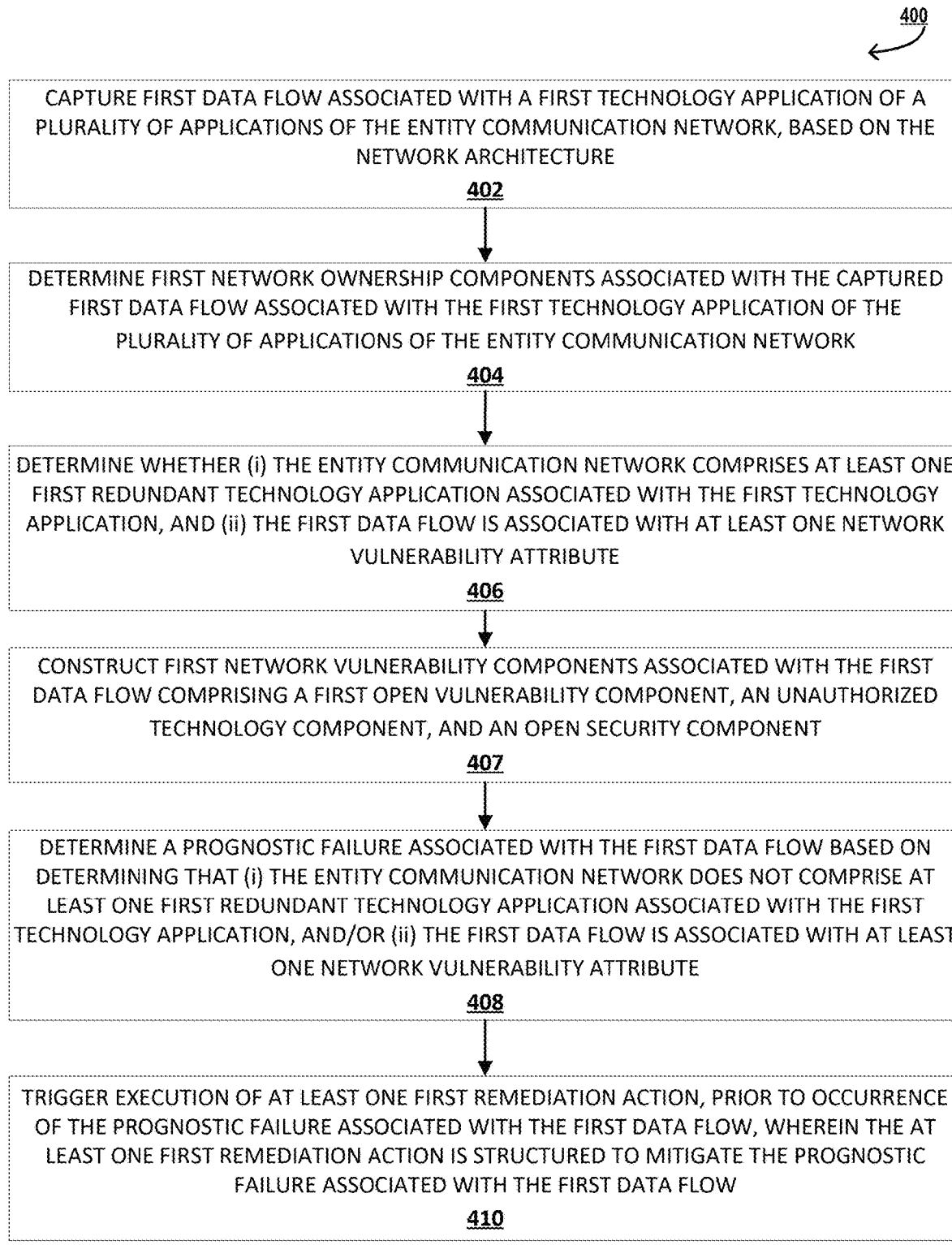

Having thus described embodiments of the invention in general terms, reference will now be made to the accompanying drawings, wherein:

FIG. 1 depicts a technology event processing system environment 100, in accordance with one embodiment of the present invention;

FIG. 2 depicts a schematic representation of a communication network environment 200, in accordance with one embodiment of the present invention;

FIG. 3 depicts a schematic representation of a proactive resiliency, redundancy and security remediation network environment 300, in accordance with one embodiment of the present invention; and FIG. 4 depicts a high level process flow 400 for proactive resiliency, redundancy and security remediation across a network based on dynamic analysis of technology applications.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity. In other embodiments, a user may be a system performing one or more tasks described herein. In some embodiments, the user may be an entity employee (e.g., an underwriter, a project manager, an IT specialist, a manager, an administrator, an internal operations analyst, bank teller or the like) capable of operating the system described herein.

As used herein, a "user interface" may be a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like.

With advancements in technology infrastructures and wireless communication implementation, entities increasingly employ various network architectures comprising modems, hubs, switches, routers, load balancers, network hosts, servers, proxy servers, input/output devices, network terminals and computers and the like. Typically, the devices in the network architecture run a plurality of technology applications for facilitating and performing a myriad of tasks and activities associated with the entity. These technology applications generate vast volumes of data flow across the network nodes. However, with existing network architectures, it is not possible to track data flows across the network nodes that are associated with a particular technology application, without which functioning of technology applications cannot be evaluated and mitigation steps cannot be implemented.

In some embodiments, the invention may construct, analyze or otherwise process technology event records such as "application logs", "source code", "resiliency record" or "technology event data file" or a "data file", or "data flow", which may be stored at various databases/storage locations (e.g., resiliency records may be stored at a network resiliency catalog database). The databases/storage locations may comprise multiple technology event records (for example, hundreds, thousands or tens of thousands of technology event records). Each technology event record may comprise multiple data elements or attributes containing electronic data regarding one or more aspects of an electronic/technology activity. In some instances, each technology event record may comprise technology elements associated with type of activity, instructions for processing the event record, technology resources involved, information associated with the users/entities/systems involved, technology platform applications involved, processing events associated with each technology application, activity attributes, time, location, person/system that initiated/performed the activity, and/or other aspects. Furthermore, the technology elements may by discrete components of the record, or the technology elements may merely refer to one or more portions of a single data component in a record. Although referred to as "a technology event record", it is understood that, in some embodiments each activity may be associated with multiple technology event records.

For example, each record may comprise one or more technology elements associated with type of activity (for example, user activity processing, etc.), instructions for processing the record (for example, type of processing), technology resources involved (for example, initiating entity system, receiving entity system, intermediate resource systems, domestic systems, international systems), technology platforms applications involved (for example, technology data processing applications, regulatory applications, internal applications), information associated with the users/ entities/systems involved (for example, initiating or first user name, first user account identifiers, receiving or second user name, second user account identifiers), activity attributes (for example, resource quantity/amount, inbound and outbound currency), timestamp, and/or other aspects. An electronic activity, also referred to as a technology activity, such as a "resource transfer" or "transaction," may refer to any activities or communication between a user or entity and the financial institution, activities or communication between multiple entities, communication between technology applications and the like.

Typically, a network for an entity comprises a myriad systems, devices and nodes, with technology applications running thereon for performing numerous actions and activities associated with the network. Systems for high volume data processing require multiple edge nodes and technology applications across various platforms running in order to implement the multiple processing stages of electronic data. Each of the technology applications is associated with source system(s), such that data from the source system(s) is transmitted to the application and/or the data from the source system(s) is required as an input for processing the respective technology application. Similarly, each of the technology applications is associated with downstream system(s), such that the output from processing of the technology application is required by, utilized by, and/or transmitted to the downstream system(s). According, the entity network is a complex web of interconnected and interdependent systems, devices, nodes, technology applications, and the like.

Processing of electronic data files typically involves multiple processing stages. Systems for high volume data processing require multiple edge nodes and applications across various platforms running in order to implement the processing stages of electronic data. Moreover, processing of applications at downstream systems requires source data from upstream systems. However, due to evolution of production environments and applications, and inherent delays in data transmissions, shifts may occur that result in decrease of application resiliency or security, thereby undesirably causing failed processes and delayed processing. Due to utilizations of prior source data that is not current and incompatible with the application in real time, downstream systems may have undesirable failed processes and delayed processing. Moreover, conventional systems are not capable of dynamic data processing based on dynamic features like redundancy while identifying the real time data flows on various source systems for cascading the changes to downstream systems. Therefore, a need exists for novel network architectures that provide proactive resiliency, redundancy and security remediation across a network based on dynamic analysis of technology applications.

The present invention provides solutions to the foregoing problems in conventional systems, and also provides additional improvements to network communication technology by providing novel proactive resiliency, redundancy and security remediation across a network based on dynamic analysis of technology applications. The present invention is configured for dynamic and continuous processing of network activity data of a distributed network for proactively identifying network redundancy prior to network activity failure. In this manner, the present invention is structured to improve network performance by providing resiliency of network components by promoting and tracking redundancy, and thereby combatting latency.

In some embodiments, "resiliency" or "network resiliency" or "application resiliency" as used herein may refer to the ability of an application of the network, or a network application, or device to recover from a failure. Here, as non-limiting illustrative examples, the failure may be associated with internal factors such as a specific type of input into an application resulting in corruption of the data, or external factors such as a user or individual tripping over a power cable causing stoppage of a server. In some embodiments, "redundancy", "network redundancy", or "application redundancy" as used herein may refer to the availability of alternate paths of traffic, alternate network devices, alternate sources of data, and/or the like, in order to ensure that processing operations of the network can continue and data can continue to be transmitted downstream even in the instance of a failure in the network. In some embodiments of the invention, the network may be structured for redundancy by providing alternative paths for routing data flow, multiple applications that are capable of performing a particular data processing function, multiple devices or components in network compatible for performing a particular data processing function or facilitating a particular data flow downstream.

Recovery point objective (RPO) or a recovery point objective (RPO) component, as used herein may refer to a time period or duration that can be lost after a recovery from a disaster, failure, or comparable event before data loss will exceed the continuity tolerance of the network or entity associated with the network.

Recovery time objective (RTO) or a recovery time objective (RTO) component, as used herein may refer to the maximum acceptable time period or duration for restoring normal operations of a network or application and regaining access to data after outage or disruption.

FIG. 1 illustrates a technology event processing system environment 100, in accordance with one embodiment of the present invention, which is structured for the novel proactive resiliency, redundancy and security remediation across a network based on dynamic analysis of technology applications. As illustrated in FIG. 1, a technology event processing system 108 (also referred to as a control system) is operatively coupled, via a network 101 to user device(s) 104, to an entity server 106, to a plurality of network nodes 180 (e.g., comprising a plurality of edge computing nodes), and to a technology server 105. In this way, the technology event processing system 108 can send information to and receive information from the user device(s) 104, the entity server 106, the plurality of network nodes 180, and the technology server 105. FIG. 1 illustrates only one example of an embodiment of the system environment 100, and it will be appreciated that in other embodiments one or more of the systems, devices, or servers may be combined into a single system, device, or server, or be made up of multiple systems, devices, or servers. In this way, the technology platform application 156 of the technology event processing system 108 is configured to extract, process, index, chart and evaluate network traffic flow, application logs, and application source codes, and perform the associated technology activities.

The network 101 may be a system specific distributive network receiving and distributing specific network feeds. The network 101 may also be a global area network (GAN), such as the Internet (201, illustrated in FIG. 2), a wide area network (WAN), a local area network (LAN), or any other type of network or combination of networks. The network 101 may provide for wireline, wireless, or a combination wireline and wireless communication between devices on the network 101. In some embodiments, at least a portion of the network 101 is an entity communication network 200 associated with the entity, illustrated in FIG. 2.

In some embodiments, the technology event processing system 108 and the plurality of network nodes 180, together with the entity server 106 and/or one or more of the user devices 104, constitute the entity communication network 200, each forming a network node of the entity communication network 200. That said, in other embodiments, it is envisaged that the entity communication network 200 comprises the plurality of network nodes 180 which interact with the technology event processing system 108, the entity server 106 and/or one or more of the user devices 104 that are external to the entity communication network 200. Typically, the network nodes (e.g., the network nodes 180, the technology event processing system 108, the entity server 106, and/or the user device(s) 104) of the entity communication network 200 comprise operative communication channels for communicating with each other, in accordance with the network architecture of the entity communication network, as will be described with respect to FIG. 2. The proactive resiliency, redundancy and security remediation performed by the invention is described with respect to FIGS. 3 and 4, later on.

In some embodiments, the user 102 may be one or more individuals or entities that may either initiate processing/execution of a technology application, require outputs downstream from technology applications, provide the electronic files for processing, desire access to at least a portion of the technology event data associated with the electronic files or records that have either been processed or are being processed, and/or the request access to data associated with the technology activities associated with the event records. As such, in some embodiments, the user 102 may be associated with the entity and/or a financial institution that may desire one or more data points associated with the processing of entity technology applications, electronic files associated with the technology event processing system.

FIG. 1 also illustrates a representative user system/device 104. As discussed, the user device(s) 104 may be, for example, a desktop personal computer, a mobile system, such as a cellular phone, smart phone, personal digital assistant (PDA), laptop, or the like, and each of the user devices (e.g., devices 104a-104d) may comprise the technical/electronic components described herein. The user device(s) 104 generally comprises a communication device 112, a processing device 114, and a memory device 116. The user device 104 is typically a computing system that is configured to enable user and device authentication for access to technology event data. The processing device 114 is operatively coupled to the communication device 112 and the memory device 116. The processing device 114 uses the communication device 112 to communicate with the network 101 and other devices on the network 101, such as, but not limited to, the entity server 106, the technology event processing system 108 and the technology server 105. As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the technology event processing system 108 and/or the entity system 106 are configured to cause the processing device 114 to execute the computer readable instructions 110, thereby causing the user device 104 to perform one or more functions described herein, for example, via the user application 122 and the associated user interface. In some embodiments, the user application 122 refers to an application stored on the user device that is configured to receive user instructions/input via an associated first user interface, and in accordance with the user input perform one or more tasks or activities and associated steps (e.g., requesting information, retrieving/receiving information, perform searches, query other applications/servers, and/or the like) whose data flow through the network is desired to be evaluated in real-time or near real-time. For example, the application may be structured to perform a first type of network activity (e.g., Website front end activities, entity logic middleware activities, server-less activities, Queueing activities, Caching activities, Database activities, DNS, Proxy, Firewall and other activities) associated with the entity.

As further illustrated in FIG. 1, the technology event processing system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more software programs and technology platform applications based on computer-readable instructions thereof, which may be stored in a memory device, for example, executing computer readable instructions 154 or computer-readable program code 154 stored in memory device 150 to perform one or more functions associated with a technology platform application 156

The processing device 148 is operatively coupled to the communication device 146 and the memory device 150. The processing device 148 uses the communication device 146 to communicate with the network 101 and other devices on the network 101, such as, but not limited to the entity server 106, the technology server 105 and the user system 104. As such, the communication device 146 generally comprises a modem, server, or other device for communicating with other devices on the network 101.

As further illustrated in FIG. 1, the technology event processing system 108 comprises the computer-readable instructions 154 stored in the memory device 150, which in one embodiment includes the computer-readable instructions 154 of the technology platform application 156. In some embodiments, the computer readable instructions 154 comprise executable instructions associated with network nodes 180, technology platform applications, proctor modules, memory locations, technology event processing module and/or its components, associated with the technology platform application 156, wherein these instructions, when executed, are typically configured to cause the applications or modules to perform/execute one or more steps described herein. In some embodiments, the memory device 150 includes data storage 152 for storing data related to the system environment, but not limited to data created and/or used by the technology platform application 156. The technology platform application 156 is further configured to perform or cause other systems and devices to perform the various steps in processing electronic records, as will be described in detail later on.

As such, the processing device 148 is configured to perform some or all of the proactive resiliency, redundancy and security remediation across a network based on dynamic analysis of technology applications steps described throughout this disclosure, for example, by executing the computer readable instructions 154. As such, in some embodiments, the technology event processing system may be referred to as a "control system", having at least one memory device 150 with computer-readable program code 154 stored thereon, at least one communication device 146, and at least one processing device 148 operatively coupled to the at least one memory device 150 and the at least one communication device 146, wherein executing the computer-readable code 154 is configured to cause the at least one processing device 148 to perform some or all of the proactive resiliency, redundancy and security remediation across a network based on dynamic analysis of technology applications steps described throughout this disclosure. In this regard, the processing device 148 may perform one or more steps singularly and/or transmit control instructions that are configured to cause technology platform applications, proctor modules, event processing modules, entity server 106, user device 104, and technology server 105 and/or other systems and applications, to perform one or more steps described throughout this disclosure.

Although various data processing steps may be described as being performed by technology platform applications, proctor modules, memory locations, technology event processing module and/or its components and the like in some instances herein, it is understood that the processing device 148 is configured to establish operative communication channels with and/or between these modules and applications, and transmit control instructions to them, via the established channels, to cause these module and applications to perform these steps.

Embodiments of the technology event processing system 108 may include multiple systems, servers, computers or the like maintained by one or many entities. FIG. 1 merely illustrates one of those systems 108 that, typically, interacts with many other similar systems to form the information network. In one embodiment of the invention, the technology event processing system 108 is operated by the entity associated with the entity server 106, while in another embodiment it is operated by a second entity that is a different or separate entity from the entity server 106. In some embodiments, the entity server 106 may be part of the technology event processing system 108. Similarly, in some embodiments, the technology event processing system 108 is part of the entity server 106. In other embodiments, the entity server 106 is distinct from the technology event processing system 108.

In one embodiment of the invention, the technology platform application 156 may be associated with technology platform applications having computer-executable program code that instructs the processing device 148 to operate the network communication device 146 to perform certain communication functions involving the technology server 105, the user device 104 and/or the entity server 106, as described herein. In one embodiment, the computer-executable program code of an application associated with the technology platform application 156 may also instruct the processing device 148 to perform certain logic, data processing, and data storing functions of the application.

The processing device 148 is configured to use the communication device 146 to receive data, such as electronic data files comprising technology event records, receive requests for processing status and processed event data, transmit processed event data and the like. In some instances, the processing device 148 stores the data that it receives in its native format in the memory device 150, for example, in an off-disk database associated with the data storage 152, described in detail with respect to FIG. 2.

In the embodiment illustrated in FIG. 1 and described throughout much of this specification, the technology platform application 156 may perform one or more of the functions described herein (e.g., steps described with respect to FIGS. 4 and 5), by the processing device 148 executing computer readable instructions 154 and/or executing computer readable instructions associated with one or more technology platform applications.

As illustrated in FIG. 1, the entity server 106 is connected to the technology event processing system 108 and may be associated with a financial institution network. In this way, while only one entity server 106 is illustrated in FIG. 1, it is understood that multiple network systems may make up the system environment 100 and be connected to the network 101. The entity server 106 generally comprises a communication device 136, a processing device 138, and a memory device 140. The entity server 106 comprises computer-readable instructions 142 stored in the memory device 140, which in one embodiment includes the computer-readable instructions 142 of an institution application 144. The entity server 106 may communicate with the technology event processing system 108. The technology event processing system 108 may communicate with the entity server 106 via a secure connection generated for secure encrypted communications between the two systems for communicating data for processing across various applications.

As further illustrated in FIG. 1, in some embodiments, the technology event processing system environment 100 further comprises one or more technology servers 105, in operative communication with the technology event processing system 108, the entity server 106, and/or the user device 104. Typically, each of the one or more technology servers 105 comprises a communication device, a processing device and memory device with computer readable instructions. In some instances, each technology server 105 comprises one or more data processing applications configured for downstream processing event records associated with the electronic files received from the technology event processing system. These applications may be operated by the processor executing the computer readable instructions associated with the technology server 105, as described previously. In some instances, the technology server 105 is owned, operated or otherwise associated with third party entities, while in other instances, the technology server 105 is operated by the entity associated with the systems 108 and/or 106. Although a single external technology server 105 is illustrated, it should be understood that, the technology server 105 may represent multiple technology servers operating in sequentially or in tandem to perform one or more data processing operations. In some embodiments, the one or more of the technology servers 105 may comprise a network resiliency catalog database (having a plurality of records associated with network components, such as resiliency records), a network performance database (having a plurality of records associated with network traffic) associated with a network traffic analyzer system 312 (illustrated in FIG. 3), a network application logs system 314 (illustrated in FIG. 3) (having a plurality of records associated with application logs), a source code repository system 316 (illustrated in FIG. 3) (having source code associated with one or more applications of the network), an application and server system of record (SOR) system 342 (illustrated in FIG. 3), an information security system of record (SOR) system 344 (illustrated in FIG. 3), and/or the like.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 depicts a schematic representation of a communication network environment 200, in accordance with one embodiment of the present invention. As discussed, in some embodiments, the technology event processing system 108 and the plurality of network nodes 180, together with the entity server 106 and/or one or more of the user devices 104, constitute the entity communication network 200, each forming a network node of the entity communication network 200. That said, in other embodiments, it is envisaged that the entity communication network 200 comprises the plurality of network nodes 180 which interact with the technology event processing system 108, the entity server 106 and/or one or more of the user devices 104 that are external to the entity communication network 200. Typically, the network nodes (e.g., the network nodes 180, the technology event processing system 108, the entity server 106, and/or the user device(s) 104) of the entity communication network 200 comprise operative communication channels for communicating with each other, in accordance with the network architecture of the entity communication network. In some embodiments, the entity communication network 200 has network nodes comprising physical nodes/ devices and/or virtual nodes such as software (e.g., for routing, switching and other data flow operations) or network applications/technology applications, such that at least a portion of the network 200 is virtualized with software. In some embodiments, the entity communication network 200 comprises a cloud computing network. In some embodiments, some or all of the network nodes are associated with technology applications.

As illustrated by FIG. 2, the entity communication network 200 comprises a plurality of nodes (e.g., 205 to 266). Some or all of the nodes 205-266 described herein may refer to the plurality of nodes 180. Moreover, the entity communication network 200 is typically in communication with an external communication network, such as the internet 201 or another network (e.g., an ISP network). The entity communication network 200 comprises a network security node 205, such as a firewall 205, that monitors and controls incoming and outgoing network traffic based on predetermined security rules. The network security node may be in operative communication with one or more network nodes 210 structured for modulating one or more carrier wave signals to encode digital information for transmission and demodulating signals to decode the transmitted information, such as modem(s) 210. The entity communication network 200 further comprises one or more network nodes 215 that are configured for traffic routing and data packet forwarding, such as router(s) 215. The router node 215 may be in operative communication with other network nodes such as, access point node(s) 230 (e.g., wireless access point 230), proxy servers, switches (240, 250), server systems 220 (e.g., entity server 106, technology event processing system 108, etc.), and the like. The wireless access point 230, typically is a networking hardware device that allows Wi-Fi or NFC compatible data terminal equipment devices (DTEs) or computing devices 236a-236c (e.g., user devices 104 such as computers, smartphones, PDAs, smart devices, etc.) to connect to a wired network. The server systems 220 (e.g., entity server 106, technology event processing system 108, etc.) may be in operative communication with database systems or database server nodes 222.

The network switch nodes (240, 250) (also called switching hubs, bridging hubs, or MAC bridges) are computer network devices/nodes that connect other devices/nodes of the network together, by using packet switching to receive, process and forward data to a destination device/node. In some embodiments, the network switch nodes (240, 250) are multi-port network bridges that use unique network hardware addresses (e.g., MAC addresses of the devices/nodes such as the data terminal equipment devices) to process and forward data at a data link layer (described later on) of the entity communication network 200. In some embodiments, the network switch nodes (240, 250) are multilayer switches that also process data at a network layer by additionally incorporating routing functionality. As illustrated by FIG. 2, the network switch 240 may connect other data terminal equipment (DTEs) devices/nodes such as server devices 242 (e.g., entity server 106, Technology event processing system 108 etc.) and a hub 244 which in turn connects nodes such as 246a-246d (e.g., entity server 106, Technology event processing system 108, user devices 104, other DTEs etc.). The hub 244 may be an Ethernet hub, active hub, network hub, repeater hub, multiport repeater or another network switch. The network switch 250 may connect network nodes such as a server 256a, a proxy server 256b, a computing device 256c, etc. The computing device 256c may in turn be operatively connected to other nodes such as a printer terminal 258 and a network bridge 260. The network bridge 260 is a computer networking device that creates a single aggregate network from multiple communication networks or network segments, such as the nodes 266a-b (e.g., computing devices or other DTEs) and the node 266c (e.g., a server or other DTEs), as illustrated. The entity communication network 200 may further comprise one or more load balancers (not illustrated).

As such, the entity communication network 200 comprises a plurality of nodes 180 such as one or more of: one or more modems, one or more hubs, one or more switches, one or more routers, one or more load balancers, and one or more data terminal equipment devices, cloud service virtual machines, VPN Gateways, traffic manager nodes, SQL servers, etc., as desired, in any suitable configuration and arrangement. The DTEs typically comprise unique network addresses (e.g., hardware addresses such as media access control (MAC) addresses, network addresses such as internet protocol (IP) addresses), such as server devices, proxy servers, one or more computing devices, one or more data output devices, and/or one or more network hosts. Moreover, in some embodiments, the network nodes 180 and connections/communication channels between the nodes may change, due to expansion, modification or maintenance of the networks. The system (e.g., the processing/control system 106) is configured to identify the current configuration of the entity communication network 200's network architecture, i.e., the plurality of network nodes of the entity communication network and their communication channels and protocols.

In some embodiments, determining the network architecture of the entity communication network by the technology platform application by the processing/control system 106 further comprises identifying data communication links between the plurality of nodes and unique network addresses (e.g., hardware addresses such as media access control (MAC) addresses, network addresses such as internet protocol (IP) addresses) of the plurality of network nodes required/utilized for operative communication using the data communication links. Here, in some embodiments, the processing/control system 106 is structured to identify a physical layer, a data link layer, a network layer, a transport layer, a session layer, a presentation layer and/or an application layer of the network architecture.

The physical layer is typically associated with transfer of bits between two network nodes involving nodes such as repeaters, hubs, modems, fiber media converters and the like. The physical layer defines the electrical and physical specifications of the data connection and defines the relationship between a device and a physical transmission medium (for example, an electrical cable, an optical fiber cable, or a radio frequency link). This includes the layout of pins, voltages, line impedance, cable specifications, signal timing and similar characteristics for connected devices and frequency (5 GHz or 2.4 GHz etc.) for wireless devices. It is responsible for transmission and reception of unstructured raw data in a physical medium. As such, identifying the physical layer of the network architecture by the control system 106 typically involves determining the above listed components of the physical layer along with networking hardware transmission protocols for transmission of bit streams physical links of the data communication links between the plurality of nodes.

The data link layer typically involves interfacing with the physical layer by providing node-to-node transfer (e.g., a link between two directly connected nodes) and involves network nodes such as network switches, network interface cards (NICs), etc., based on physical addressing schemes (e.g., MAC addresses). The data link layer is also configured for detection and correction of errors in the physical layer and defines protocols for establishing and terminating a connection between two physically connected nodes/devices and protocols governing data flow control between them, such as Point-to-Point Protocol (PPP), Media access control (MAC) layer protocols for data transmission permissions/access and flow control and Logical link control (LLC) layer protocols for encapsulating network layer protocols and frame synchronization. Identifying the data link layer of the network architecture by the control system 106, typically involves determining the foregoing and the networking transmission protocols for frame synchronization, logical link control and media access control associated with the data communication links between the plurality of nodes. In this regard, the control system 106 typically identifies media access control (MAC) addresses of at least a portion of the plurality of nodes (e.g., for some or all of the network nodes that contain MAC addresses).

The network layer typically is associated with data packet delivery from end (e.g., source node) to end (intermediate or destination node) by utilizing a logical network addressing scheme such as Internet Protocol (IP) addresses, involving nodes such as routers. As such, the network layer provides the functional and procedural means of transferring variable length data sequences (called datagrams) from one node to another. The network layer is structured to deliver the message to the destination node, possibly routing it through intermediate nodes. If the message is too large to be transmitted from one node to another on the data link layer between those nodes, the network layer may implement message delivery by splitting the message into several fragments (multiple data packets) at one node, sending the fragments independently, and reassembling the fragments at another node. Identifying the network layer of the network architecture by the control system 106 typically involves identifying data packet forwarding and routing protocols associated with the data communication links between the plurality of nodes and identifying internet protocol (IP) addresses of at least a portion of the plurality of nodes.

Moreover, the transport layer provides the functional and procedural means of transferring variable-length data sequences from a source to a destination host via one or more networks, while maintaining the quality of service functions, using a transport-layer protocol such as a Transmission Control Protocol (TCP) or a User Datagram Protocol (UDP). Identifying the transport layer of the network architecture typically involves determining host-to-host communication protocols for technology applications associated with at least a portion of the plurality of nodes. The session layer is associated with establishing, managing and terminating the connections between the local and remote applications. The presentation layer establishes context between application-layer entities, in which the application-layer entities may use different syntax and semantics if the presentation service provides a mapping between them. The application layer interacts with the technology applications (software) that implement a communicating component, including identifying communication partners, determining resource availability, and synchronizing communication.

FIG. 3 depicts a schematic representation of a depicts a schematic representation of a proactive resiliency, redundancy and security remediation network environment 300, in accordance with one embodiment of the present invention. Typically, the network environment comprises a plurality of network nodes 180, as described previously. Typically, the plurality of network nodes 180 comprise a plurality of edge computing nodes (302, 312, 314, 316, 322, 342, 344, and/or the like). In some embodiments, each of the plurality of edge computing nodes are associated with, and operate upon, dynamic network data or data flow associated with technology applications of the network.

The network environment further comprises a plurality of servers 302, a network traffic analyzer system 312, a network application logs system 314, a source code repository system 316, an artificial intelligence (AI)/machine learning (ML) engine system 322, an application and server system of record (SOR) system 342, and an information security system of record (SOR) system 344.

In some embodiments, the network traffic analyzer system 312 is structured to identify and capture first data flow associated with a first technology application of a plurality of applications of the servers 302. In some embodiments, the network traffic analyzer system 312 comprises a network traffic analyzer or network traffic sniffer structured to identify, capture, and analyze network traffic associated with each of the plurality network nodes (e.g., nodes 180, servers 302, and/or the like). In some embodiments, the network traffic analyzer system 312 is structured to discover Application Programing Interfaces (APIs), their activity data and network processing context elements based on analyzing network traffic. In some embodiments, the data flow, or the network traffic itself, may comprise (i) data flow between network nodes, (ii) perimeter/security network or network layer's (e.g., DMZ) traffic security scan data, (iii) perimeter/security network or network layer's logs data such as firewalls, (iv) network logs data such as routers, switches, load balancers logs, (v) existing custom network tools data exposed via APIs or data stores, (vi) Application Performance Monitoring (APM) tools controller data, (vii) logging and analytics tools indices, (viii) system level performance data collections based on system loads, including CPU activity, memory/paging, interrupts, device load, network and swap space utilization, kernel threads in the run and wait queue, memory, paging, disks, interrupts, system calls, context switches, and CPU activity, active ports, network connection parameters (received and sent data packets, etc.), system input/output device loading, and/or distributed native operating system tools, (ix) artifact repositories, and/or (x) source code repositories (such as Git or Bitbucket).

The network application logs system 314 is typically structured to analyze application logs associated with each of the plurality of applications of the entity communication network. Moreover, the source code repository system 316 is structured to extract extracting application source code associated with the first technology application from a source code repository.

Subsequently, the AI/ML engine system 322 is structured to determine first network ownership components associated with the captured first data flow associated with the first technology application of the plurality of applications of the entity communication network. The AI/ML engine system 322 may determine this based on data constructed or determined in previous step by the systems 312-316, such as source/destination IP/hostname from network device inventory system of record. The AI/ML engine system 322 may then determine the application tag/ID from the device ownership record from network application inventory system of record.

The AI/ML engine system 322 may then query a network resiliency catalog database to determine whether a record associated with the first network ownership components and the first network application identifier. Here, the AI/ML engine system 322 may determine if the activity exists in the network resiliency catalog database by using the ownership information/app ID determined in the previous step and querying the network resiliency catalog database. In response to a failure to determine a match between a plurality of records of the network resiliency catalog database and the first network ownership components and the first network application identifier (e.g., if the activity doesn't exist in the catalog), the system may then construct a first resiliency record associated with the first data flow from metadata associated with the first network ownership components and the first network application identifier. In some embodiments, the network resiliency catalog database may be a repository for all of the activities and analyses processed by the AI/ML engine system 322. If there is an application with an RTO component of 48 hours, it is likely not running across multiple data centers at a certain point in time. Hence, the system utilizes a catalog to capture history of traffic being identified across multiple data centers to at least determine the existence of that traffic.

Next, the AI/ML engine system 322 may determine a security mechanism data structure associated with the first data flow from the first resiliency record. The security mechanism data structure may be associated with a possibility of failure model of the activity of the technology application. The AI/ML engine system 322 may determine the security mechanism data structure of the activity extracting and analyzing data from various systems described above. Here, the system may then construct first network resiliency components associated with the first data flow, such as a first recovery point objective (RPO) component, a first recovery time objective (RTO) component, and a criticality level component, based on extracting and analyzing data from the application and server SOR system 342, and determine the security mechanism data structure based on the network resiliency components. Moreover, the system may also determine the security mechanism data structure based on extracting and analyzing open vulnerabilities against the technology application, usage or non-permitted technologies, and/or the like from the information security SOR system 344.

In some embodiments, the AI/ML engine system 322 may then validate and apply appropriate activity policies based on the security mechanism data structure determined above, using network tools such as a proxy/gateway to apply policies (i.e. via a proxy/gateway). In some embodiments, if the system determines that the security parameters of the first data flow exceed the permitted parameters under the security mechanism data structure, or as information security guidelines dictate, the system may apply the policies using a remediation engine (332, 334). In other embodiments, if the system determines that the security parameters of the first data flow are acceptable under the permitted parameters under the security mechanism data structure, the system may transmit an alert to the owner (e.g., overarching application or system, user, and/or the like) via various network communication channels to remediate the activity.

In some embodiments, based on the applications recovery objectives, the AI/ML engine system 322 may analyze all activities in the catalog and groups activities based on their source layer(s), destination layer(s) and protocol(s). The system may determine a prognostic failure associated with the first data flow based on determining that (i) the entity communication network does not comprise at least one first redundant technology application associated with the first technology application, and/or (ii) the first data flow is associated with at least one network vulnerability attribute. Here, in some embodiments, recent captures of activities within a group are identified for redundancy and resiliency. If the recent captures do not meet a pattern required for an application's recovery objectives, escalation is performed via the organizations policies (i.e. incident ticket, notifications, and/or the like). In this regard, the system may trigger execution of at least one first remediation action (332, 334), prior to occurrence of the prognostic failure associated with the first data flow, wherein the at least one first remediation action is structured to mitigate the prognostic failure associated with the first data flow.

FIG. 4 depicts a high level process flow 400 for proactive resiliency, redundancy and security remediation across a network based on dynamic analysis of technology applications, in accordance with some embodiments of the invention. In some embodiments, some or all of the steps herein are performed by the system 108 (referred to as "the system") either by itself, and/or by the system causing other nodes, devices, components of the network to perform the step(s). In some embodiments, the technology platform application 156, via the artificial intelligence (AI)/machine learning (ML) engine system 322, may perform one or more of the steps described herein, by the processing device 148 executing computer readable instructions 154 and/or executing computer readable instructions associated with one or more technology platform applications.

As illustrated by block 402 the system may capture first data flow associated with a first technology application of a plurality of applications of the entity communication network, based on the network architecture. Here, in some embodiments, the system is structured to identify all the activities through the network traffic analysis, through logs, and process lists and source codes, and configuration files. Typically, in some embodiments, the system identifies all the activities and processes that the applications use in order for them to function, and catalog them in a way that is compatible to identify redundancies, e.g., as discussed with respect to block 404 and 406. For example, the system may identify a particular traffic between an application server and a database. Subsequently, the system may catalog the identified traffic as it is identified/tagged by a network traffic and a ledger.

As previously discussed with respect to FIG. 3, the network traffic analyzer system 312 is structured to identify and capture first data flow associated with a first technology application of a plurality of applications of the servers 302. In some embodiments, the network traffic analyzer system 312 comprises a network traffic analyzer or network traffic sniffer structured to identify, capture, and analyze network traffic associated with each of the plurality network nodes (e.g., nodes 180, servers 302, and/or the like). In some embodiments, the network traffic analyzer system 312 is structured to discover Application Programing Interfaces (APIs), their activity data and network processing context elements based on analyzing network traffic. In some embodiments, the data flow, or the network traffic itself, may comprise (i) data flow between network nodes, (ii) perimeter/security network or network layer's (e.g., DMZ) traffic security scan data, (iii) perimeter/security network or network layer's logs data such as firewalls, (iv) network logs data such as routers, switches, load balancers logs, (v) existing custom network tools data exposed via APIs or data stores, (vi) Application Performance Monitoring (APM) tools controller data, (vii) logging and analytics tools indices, (viii) system level performance data collections based on system loads, including CPU activity, memory/paging, interrupts, device load, network and swap space utilization, kernel threads in the run and wait queue, memory, paging, disks, interrupts, system calls, context switches, and CPU activity, active ports, network connection parameters (received and sent data packets, etc.), system input/output device loading, and/or distributed native operating system tools, (ix) artifact repositories, and/or (x) source code repositories (such as Git or Bitbucket).

The network application logs system 314 is typically structured to continuously, and in real-time, analyze application logs associated with each of the plurality of applications of the entity communication network. Moreover, the source code repository system 316 is structured to extract extracting application source code associated with the first technology application from a source code repository. In some embodiments, the system may capture the first data flow associated with the first technology application by analyzing network traffic associated with each of the plurality network nodes, analyzing application logs associated with each of the plurality of applications of the entity communication network, and extracting application source code associated with the first technology application from a source code repository.

Next, at block 404, the system may determine first network ownership components associated with the captured first data flow associated with the first technology application of the plurality of applications of the entity communication network. Here, the system may determine the node, system, or entity responsible for remediating a resiliency issue. Here, for example, the system may determine whether a particular action associated with the data flow is an application issue, a server issue, or a database issue. Here, in some embodiments, the system may determine the first network ownership components comprising a source component identifier, a destination component identifier, and hostname component associated with the first data flow at a network device inventory system of record. The system may further determine the first technology application associated with the first data flow based on identifying a first network application identifier associated with the network ownership components at a network application inventory system of record.

As discussed previously, the AI/ML engine system 322 is structured to determine first network ownership components associated with the captured first data flow associated with the first technology application of the plurality of applications of the entity communication network. The AI/ML engine system 322 may determine this based on data constructed or determined in previous step by the systems 312-316, such as source/destination IP/hostname from network device inventory system of record. The AI/ML engine system 322 may then determine the application tag/ID from the device ownership record from network application inventory system of record.

Next, at block 406, the system may, based on the determined network ownership components associated with the captured first data flow, determine whether (i) the entity communication network comprises at least one first redundant technology application associated with the first technology application such that the at least one first redundant technology application renders at least one processing activity of the first technology application resilient, and (ii) the first data flow is associated with at least one network vulnerability attribute.

First, the system may determine whether the entity communication network comprises at least one first redundant technology application associated with the first technology application such that the at least one first redundant technology application renders at least one processing activity of the first technology application resilient. For example, the system may identify a particular traffic between an application server and a database. Here, the system would also look for identical traffic, having the same type of data transfer. If there is none, based on the recovery-time objectives (RTO) and other objectives of the application, the system constructs appropriate indications or incidents to make implement the requirement for resiliency in a timely manner.

Second, the system may determine whether the first data flow is associated with at least one network vulnerability attribute. Typically, the system is structured for identifying possibilities of network or network component or process failure, not just from a resiliency perspective, but also from a vulnerability perspective. As a non-limiting example, in the event that the system identifies traffic that the system determines to fall under the possibility of a network component or process failure (e.g., having at least one network vulnerability attribute indicative of present or historical possibility of failure), such as using specific versions of software or modules (found to be previously vulnerable to attacks by unauthorized systems) or known malicious actors, the system also determines prognostic failures at step 408, thereby ensuring that resiliency of the application is mitigated. For example, if the system determines that a specific version of a software is vulnerable (to unauthorized access, unauthorized control, etc.), the system may determine a vulnerability attribute associated with applications, servers, and other nodes that employ the particular version of the software determined to be vulnerable, and thereby flag for possibility of a failure.

Typically, the system constantly studies and analyzes data flows (e.g., network traffic, application logs, source code repositories, etc.) related to processes that are running within servers of the network, to ensure that equivalents are running on other systems as well. Here, the system not only determines whether there are equivalents, but also determines whether the equivalents are ready to accept traffic in a manner compatible with the RTO and RPO factors.

Here, for example, source code analysis can be used to determine whether a particular application has the ability to automatically switch to alternate locations in the event of a failure. In this manner, the system may determine whether a particular activity associated with the application is redundant or can be redundant at a particular point in time (e.g., within the required RTO or RPO factors). As discussed previously, in some embodiments, redundancy can be reflected in having multiple sources or destinations for an activity. For example, if an application requires a database that stores data that the application needs to retrieve data from, the system analyzes the data flow and the network architecture to determine whether there are other databases the application can extract the required data from, so that if data retrieval from one of the databases fails, the application can still continue by using another database.

In some embodiments, the system determines whether the data flow or the traffic that it identifies has a redundant counterpart in the other data flows or other traffic that it identifies. If not, the system may trigger an alert. Alternatively, the system may identify an equivalent process that performs the same function on different servers.

In some embodiments, the system may query a network resiliency catalog database to determine whether a record associated with the first network ownership components and the first network application identifier exists at the network resiliency catalog database. In response to a failure to determine a match between a plurality of records of the network resiliency catalog database and the first network ownership components and the first network application identifier, the system may further construct a first resiliency record associated with the first data flow from metadata associated with the first network ownership components and the first network application identifier.

In some embodiments, the system may query a network resiliency catalog database to determine whether a record associated with the first network ownership components and the first network application identifier exists at the network resiliency catalog database. Furthermore, the system may, in response to determining a match of at least a portion of a first resiliency record of the plurality of records of the network resiliency catalog database with the first network ownership components and the first network application identifier, extract a security mechanism data structure associated with the first data flow from the first resiliency record.

The AI/ML engine system 322 may then query a network resiliency catalog database to determine whether a record associated with the first network ownership components and the first network application identifier. Here, the AI/ML engine system 322 may determine if the activity exists in the network resiliency catalog database by using the ownership information/app ID determined in the previous step and querying the network resiliency catalog database. In response to a failure to determine a match between a plurality of records of the network resiliency catalog database and the first network ownership components and the first network application identifier (e.g., if the activity doesn't exist in the catalog), the system may then construct a first resiliency record associated with the first data flow from metadata associated with the first network ownership components and the first network application identifier. In some embodiments, the network resiliency catalog database may be a repository for all of the activities and analyses processed by the AI/ML engine system 322. If there is an application with an RTO component of 48 hours, it is likely not running across multiple data centers at a certain point in time. Hence, the system utilizes a catalog to capture history of traffic being identified across multiple data centers to at least determine the existence of that traffic.

In some embodiments, the system may construct first network resiliency components associated with the first data flow, wherein the first network resiliency components comprise a first recovery point objective component, a first recovery time objective component, and a criticality level component.

As discussed previously, recovery point objective (RPO) or a recovery point objective (RPO) component, as used herein may refer to a time period or duration that can be lost after a recovery from a disaster, failure, or comparable event before data loss will exceed the continuity tolerance of the network or entity associated with the network. For example, if an application is associated with an RPO component of 24 hours, and the system determines that the only resiliency, or way for the application to recover from a failure is to switch to a back-up database, the system determines whether that back-up database comprises all data available up to 24 hours from the failure (e.g., whether all data is replicated within 24 hours from the primary database in the back-up database). For example, if an application is associated with an RPO component of 30 seconds, the system determines whether that back-up database replicates the data at a minimum of every 30 seconds, or more frequently.

As discussed previously, recovery time objective (RTO) or a recovery time objective (RTO) component, as used herein may refer to the maximum acceptable time period or duration for restoring normal operations of a network or application and regaining access to data after outage or disruption. If an application undergoes a failure or if the system determines that the application is likely to be associated with a failure, the system determines a first RTO component associated with the application, e.g., 30 seconds, 2 hours, etc. If the system determines that the application is not redundant enough to recover within the designated first RTO component, the system may determine a prognostic failure associated with the application. The criticality level component may refer to a measure of a possibility of a failure, a security level, and/or the like.

Here, in some embodiments, determining whether the entity communication network comprises at least one first redundant technology application further comprises determining whether the at least one first redundant application matches the first network resiliency components associated with the first data flow.

Next, at block 408, the system may determine a prognostic failure associated with the first data flow based on determining that (i) the entity communication network does not comprise at least one first redundant technology application associated with the first technology application, and/or (ii) the first data flow is associated with at least one network vulnerability attribute.

Here, the system employs network traffic analyzers/sniffers to analyze, in real-time, all traffic across network ports. For instance, the system may analyze a network switchport to determine data flow. For instance, the system may determine a current surge, e.g., that a large number of systems (above a predetermined threshold number of systems such as a daily average) are accessing a particular server causing large volume of data flow, or a future surge, e.g., that a large number of systems (above a predetermined threshold number of systems such as a daily average) are likely to access a particular server causing large volume of data flow based on analyzing associated component data. In some embodiments, the system establishes a threshold or baseline, such that occurs outside of the thresholds or baselines causes an alert mechanism, a prediction of where the failure is, and a response for mitigation.

The system may determine the data flow volume going up to be a first indicator, and network surge in traffic to be a second indicator, which drive an increase disk drive usage. The system may then determine that the determined increase, or projected growth that is so large that it may cause a failure (e.g., the large volume of data flow causing disc space in the server or another associated system to run out), and thereby cause an outage. In response to determining these indicators/triggers, the system proactively determines, e.g., within minutes of the surge, that the surge is structured to cause a failure imminently or within a determined time period. In other words, the system identifies an immediate change to the normal behavior, and not only prognostically determines that the change is structured to cause a failure, but further (i) specifically determines the network nodes where the failure is structured to occur, e.g., a downstream system, and (ii) when the failure is structured to occur, e.g., within a first time period following the indicator/trigger.

Here, for example, source code analysis can be used to determine whether a particular application has the ability to automatically switch to alternate locations in the event of a failure. In this manner, the system may determine whether a particular activity associated with the application is redundant or can be redundant at a particular point in time (e.g., within the required RTO or RPO factors). In the event that the system identifies that the particular activity associated with the application is not redundant or that it is not structured to be redundant at the particular point in time (e.g., within the required RTO or RPO factors), the system may determine a prognostic failure associated with the application, or a prognostic failure associated with the data flow associated with the application.

In some embodiments, as discussed previously, the system constantly and in real-time analyzes the data flows, whether it is network traffic or processes within all of technology stacks of the network. Thereby, the system is structured to proactively patch points of resiliency that are now no longer available or used, and hence implements remediation measures before the surges even materialize or occur.

In some embodiments, determining the prognostic failure associated with the first data flow further comprises determining that a second recovery point objective component associated with the at least one first redundant application exceeds the first recovery point objective component associated with the first data flow. In some embodiments, determining the prognostic failure associated with the first data flow further comprises determining that a second recovery time objective component associated with the at least one first redundant application exceeds the first recovery time objective component associated with the first data flow.

In some embodiments, as illustrated by block 407, the system may construct first network vulnerability components associated with the first data flow, wherein the first network resiliency components comprise a first open vulnerability component, an unauthorized technology component, and an open security component. Here, in some embodiments, determining the prognostic failure associated with the first data flow further comprises determining a match between the first data flow and at least a portion of the first network vulnerability component. Moreover, in some embodiments, triggering the execution of the at least one remediation action, prior to occurrence of the prognostic failure associated with the first data flow, further comprises blocking the processing of the first data flow.

Next, at block 410, the system may trigger execution of at least one first remediation action, prior to occurrence of the prognostic failure associated with the first data flow, wherein the at least one first remediation action is structured to mitigate the prognostic failure associated with the first data flow. In some embodiments, the remediation action may comprise blocking of the data flow. In some embodiments, the remediation action may comprise escalating a priority associated with the data flow such that an alternative route for processing the data flow is constructed in order to achieve resiliency, before occurrence of the predicted prognostic failure. In some embodiments, the remediation action may comprise transmitting a real-time alert to a remediation system of the network in order to trigger implementation of mitigating action, prior to occurrence of the predicted prognostic failure.

In some embodiments, as discussed previously, the system constantly and in real-time analyzes the data flows, whether it is network traffic or processes within all of technology stacks of the network. Thereby, the system is structured to proactively patch points of resiliency that are now no longer available or used, and hence implements remediation measures before the surges even materialize or occur.

In some embodiments, the AI/ML engine system 322 may then validate and apply appropriate activity policies based on the security mechanism data structure determined above, using network tools such as a proxy/gateway to apply policies (i.e. via a proxy/gateway). In some embodiments, if the system determines that the security parameters of the first data flow exceed the permitted parameters under the security mechanism data structure, or as information security guidelines dictate, the system may apply the policies using a remediation engine (332, 334). In other embodiments, if the system determines that the security parameters of the first data flow are acceptable under the permitted parameters under the security mechanism data structure, the system may transmit an alert to the owner (e.g., overarching application or system, user, and/or the like) via various network communication channels to remediate the activity.

Moreover, in some instances, the system may successfully identify a redundancy such that the redundancy is structured to provide resiliency for a data flow. Here, the system may automatically divert the data flow to the determined alternative system or node in response determining a potential disruption at the initial data flow, prior to occurrence of a failure, as detailed below. In some embodiments, the system may capture second data flow associated with a second technology application of the plurality of applications of the entity communication network. The system may then determine second network ownership components associated with the captured second data flow. Based on the determined network ownership components associated with the captured first data flow, the system may determine that the entity communication network comprises at least one second redundant technology application associated with the second technology application such that the at least one second redundant technology application renders at least one processing activity of the second technology application resilient. Next, the system may trigger execution of at least one second remediation action, prior to occurrence of a second prognostic failure associated with the second data flow, wherein the at least one remediation action is structured to transfer processing of the second data flow to the at least one second redundant technology application.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for proactive resiliency, redundancy and security remediation across a network based on dynamic analysis of technology applications, wherein the system is configured for dynamic and continuous processing of network activity data of a distributed network for proactively identifying network redundancy prior to network activity failure, the system comprising:
   an entity communication network comprising a plurality of network nodes;
   a control system in operative communication with the entity communication network;
   at least one memory device with computer-readable program code stored thereon;
   at least one communication device;
   at least one processing device operatively coupled to the at least one memory device and the at least one communication device, wherein the at least one processing device executes the computer-readable code to:
      capture a first data flow associated with a first technology application of a plurality of applications of the entity communication network, based on network architecture;
      determine first network ownership components associated with the first data flow associated with the first technology application of the plurality of applications of the entity communication network;
      based on the determined network ownership components associated with the first data flow, determine whether (i) the entity communication network comprises at least one first redundant technology application associated with the first technology application such that the at least one first redundant technology application renders at least one processing activity of the first technology application resilient, and (ii) the first data flow is associated with at least one network vulnerability attribute;
      construct first network vulnerability components associated with the first data flow, wherein the first network vulnerability components comprise a first open vulnerability component, an unauthorized technology component, and an open security component;
      determine a prognostic failure associated with the first data flow based on determining that (i) the entity communication network does not comprise at least one first redundant technology application associated with the first technology application, and/or (ii) the first data flow is associated with at least one network vulnerability attribute, wherein determining the prognostic failure associated with the first data flow further comprises determining a match between the first data flow and at least a portion of the first network vulnerability components; and
      trigger execution of at least one first remediation action, prior to occurrence of the prognostic failure associated with the first data flow, wherein the at least one first remediation action is structured to mitigate the prognostic failure associated with the first data flow, wherein triggering the execution of the at least one remediation action, prior to occurrence of the prognostic failure associated with the first data flow, further comprises blocking the processing of the first data flow.

2. The system of claim 1, wherein capturing the first data flow associated with the first technology application further comprises:
   analyzing network traffic associated with each of the plurality network nodes;
   analyzing application logs associated with each of the plurality of applications of the entity communication network; and
   extracting application source code associated with the first technology application from a source code repository.

3. The system of claim 2, wherein the at least one processing device executes the computer-readable code to:
   determine the first network ownership components comprising a source component identifier, a destination component identifier, and hostname component associated with the first data flow at a network device inventory system of record; and
   determine the first technology application associated with the first data flow based on identifying a first network application identifier associated with the network ownership components at a network application inventory system of record.

4. The system of claim 3, wherein the at least one processing device executes the computer-readable code to:
   query a network resiliency catalog database to determine whether a record associated with the first network ownership components and the first network application identifier; and
   construct a first resiliency record associated with the first data flow from metadata associated with the first network ownership components and the first network application identifier, in response to a failure to determine a match between a plurality of records of the network resiliency catalog database and the first network ownership components and the first network application identifier.

5. The system of claim 3, wherein the at least one processing device executes the computer-readable code to:
query a network resiliency catalog database to determine whether a record associated with the first network ownership components and the first network application identifier; and
in response to determining a match of at least a portion of a first resiliency record of the plurality of records of the network resiliency catalog database with the first network ownership components and the first network application identifier, extract a security mechanism data structure associated with the first data flow from the first resiliency record.

6. The system of claim 1, wherein the at least one processing device executes the computer-readable code to:
construct first network resiliency components associated with the first data flow, wherein the first network resiliency components comprise a first recovery point objective component, a first recovery time objective component, and a criticality level component.

7. The system of claim 6, wherein determining whether the entity communication network comprises at least one first redundant technology application further comprises determining whether the at least one first redundant application matches the first network resiliency components associated with the first data flow.

8. The system of claim 6, wherein determining the prognostic failure associated with the first data flow further comprises:
determining that a second recovery point objective component associated with the at least one first redundant application exceeds the first recovery point objective component associated with the first data flow; and
determining that a second recovery time objective component associated with the at least one first redundant application exceeds the first recovery time objective component associated with the first data flow.

9. The system of claim 1, wherein the at least one processing device executes the computer-readable code to:
capture second data flow associated with a second technology application of the plurality of applications of the entity communication network;
determine second network ownership components associated with the captured second data flow;
based on the determined network ownership components associated with the first data flow, determine that the entity communication network comprises at least one second redundant technology application associated with the second technology application such that the at least one second redundant technology application renders at least one processing activity of the second technology application resilient; and
trigger execution of at least one second remediation action, prior to occurrence of a second prognostic failure associated with the second data flow, wherein the at least one remediation action is structured to transfer processing of the second data flow to the at least one second redundant technology application.

10. A computer program product for proactive resiliency, redundancy and security remediation across a network based on dynamic analysis of technology applications, wherein the computer program product is configured for dynamic and continuous processing of network activity data of a distributed network for proactively identifying network redundancy prior to network activity failure, the computer program product comprising a non-transitory computer-readable storage medium having computer-executable instructions to:
capture a first data flow associated with a first technology application of a plurality of applications of an entity communication network, based on network architecture;
determine first network ownership components associated with the first data flow associated with the first technology application of the plurality of applications of the entity communication network;
based on the determined network ownership components associated with the first data flow, determine whether (i) the entity communication network comprises at least one first redundant technology application associated with the first technology application such that the at least one first redundant technology application renders at least one processing activity of the first technology application resilient, and (ii) the first data flow is associated with at least one network vulnerability attribute;
construct first network vulnerability components associated with the first data flow, wherein the first network vulnerability components comprise a first open vulnerability component, an unauthorized technology component, and an open security component;
determine a prognostic failure associated with the first data flow based on determining that (i) the entity communication network does not comprise at least one first redundant technology application associated with the first technology application, and/or (ii) the first data flow is associated with at least one network vulnerability attribute, wherein determining the prognostic failure associated with the first data flow further comprises determining a match between the first data flow and at least a portion of the first network vulnerability components; and
trigger execution of at least one first remediation action, prior to occurrence of the prognostic failure associated with the first data flow, wherein the at least one first remediation action is structured to mitigate the prognostic failure associated with the first data flow, wherein triggering the execution of the at least one remediation action, prior to occurrence of the prognostic failure associated with the first data flow, further comprises blocking the processing of the first data flow.

11. The computer program product of claim 10, wherein capturing the first data flow associated with the first technology application further comprises:
analyzing network traffic associated with each of a plurality network nodes;
analyzing application logs associated with each of the plurality of applications of the entity communication network; and
extracting application source code associated with the first technology application from a source code repository.

12. The computer program product of claim 10, wherein the non-transitory computer-readable storage medium further comprises computer-executable instructions to:
construct first network resiliency components associated with the first data flow, wherein the first network resiliency components comprise a first recovery point objective component, a first recovery time objective component, and a criticality level component.

13. The computer program product of claim 12, wherein determining the prognostic failure associated with the first data flow further comprises:
- determining that a second recovery point objective component associated with the at least one first redundant application exceeds the first recovery point objective component associated with the first data flow; and
- determining that a second recovery time objective component associated with the at least one first redundant application exceeds the first recovery time objective component associated with the first data flow.

14. A computer implemented method for proactive resiliency, redundancy and security remediation across a network based on dynamic analysis of technology applications, wherein the computer implemented method is configured for dynamic and continuous processing of network activity data of a distributed network for proactively identifying network redundancy prior to network activity failure, the computer implemented method comprising:
- capturing a first data flow associated with a first technology application of a plurality of applications of an entity communication network, based on network architecture;
- determining first network ownership components associated with the first data flow associated with the first technology application of the plurality of applications of the entity communication network;
- based on the determined network ownership components associated with the first data flow, determining whether (i) the entity communication network comprises at least one first redundant technology application associated with the first technology application such that the at least one first redundant technology application renders at least one processing activity of the first technology application resilient, and (ii) the first data flow is associated with at least one network vulnerability attribute;
- constructing first network vulnerability components associated with the first data flow, wherein the first network vulnerability components comprise a first open vulnerability component, an unauthorized technology component, and an open security component;
- determining a prognostic failure associated with the first data flow based on determining that (i) the entity communication network does not comprise at least one first redundant technology application associated with the first technology application, and/or (ii) the first data flow is associated with at least one network vulnerability attribute, wherein determining the prognostic failure associated with the first data flow further comprises determining a match between the first data flow and at least a portion of the first network vulnerability components; and
- triggering execution of at least one first remediation action, prior to occurrence of the prognostic failure associated with the first data flow, wherein the at least one first remediation action is structured to mitigate the prognostic failure associated with the first data flow, wherein triggering the execution of the at least one remediation action, prior to occurrence of the prognostic failure associated with the first data flow, further comprises blocking the processing of the first data flow.

15. The computer implemented method of claim 14, wherein capturing the first data flow associated with the first technology application further comprises:
- analyzing network traffic associated with each of a plurality network nodes;
- analyzing application logs associated with each of the plurality of applications of the entity communication network; and
- extracting application source code associated with the first technology application from a source code repository.

16. The computer implemented method of claim 14, wherein the computer implemented method further comprises:
- constructing first network resiliency components associated with the first data flow, wherein the first network resiliency components comprise a first recovery point objective component, a first recovery time objective component, and a criticality level component.

17. The computer implemented method of claim 16, wherein determining the prognostic failure associated with the first data flow further comprises:
- determining that a second recovery point objective component associated with the at least one first redundant application exceeds the first recovery point objective component associated with the first data flow; and
- determining that a second recovery time objective component associated with the at least one first redundant application exceeds the first recovery time objective component associated with the first data flow.

* * * * *